Patented Sept. 19, 1922.

1,429,483

UNITED STATES PATENT OFFICE.

CARL BOSCH AND WILHELM MEISER, OF LUDWIGSHAFEN-ON-THE-RHINE, GERMANY, ASSIGNORS, BY MESNE ASSIGNMENTS, TO BADISCHE ANILIN & SODA FABRIK, OF LUDWIGSHAFEN-ON-THE-RHINE, BAVARIA, GERMANY, A CORPORATION OF THE GRAND DUCHY OF BADEN.

PROCESS OF MANUFACTURING UREA.

No Drawing. Application filed July 9, 1920. Serial No. 395,149.

*To all whom it may concern:*

Be it known that we, CARL BOSCH and WILHELM MEISER, citizens of Germany, residing at Ludwigshafen-on-the-Rhine, Germany, have invented new and useful Improvements in Processes of Manufacturing Urea (for which I have made application in Germany, Aug. 9, 1916; in Austria, July 14, 1917; and in Hungary, July 21, 1917), of which the following is a specification.

The present invention relates to an improved method of manufacturing urea. We have found that the production of urea from carbon dioxid and ammonia can be effected in a simple manner by forcing the mixture of the two gases in about the proportions required according to the equation $$2NH_3 + CO_2 = CO(NH_2)_2 + H_2O$$

into a vessel capable of withstanding the pressure and maintaining the melt of ammonium salts formed, at the temperature suitable for the transformation of ammonium-carbamate into urea say from about 130 to 140 degrees centigrade introducing as much additional heat as may be found necessary. The compression and conveyance of the mixed ammonia and carbon dioxid is rendered possible, according to the invention, by keeping the compressor and the pipe connections at a temperature sufficiently high to avoid the separation of liquid or solid ammonium carbamate, or carbonates. By this process the separation of ammonium carbamate in a solid, or liquid, state becomes unnecessary, and it is even possible to work continuously. In order to obtain this result, the reaction mass, after urea has been formed, is slowly discharged, while maintaining the pressure in the vessel, and the mass withdrawn is separated while lowering its pressure, into a solution of urea and a gaseous mixture of ammonia and carbon dioxid, which mixture is again compressed and forced back into the vessel.

For example, the process is carried out in the following manner. A suitable mixture of carbon dioxid and ammonia, preferably in a somewhat moist condition, is forced, by means of a preheated compressor, into an autoclave and the melt obtained kept at about 135 degrees centigr. for say two hours. Then the reaction mass, being under pressure of from about 50 to 100 atmospheres depending on the temperature of the reaction mass, is slowly released through a bottom valve into a distillation apparatus, e. g., a column, in which the unaltered starting material is expelled in the form of a mixture of carbon dioxid and ammonia, partly by the heat of the melt itself, partly by heat introduced into the column, e. g., by introducing steam from below, whilst a solution of urea, practically free from ammonium salts, runs off from the bottom. The column is preferably provided with a dephlegmator and the mixture of ammonia and carbon dioxid escaping from it is directly drawn off by the compressor and again forced into the autoclave. The compressor and connection pipes are sufficiently preheated to avoid precipitation of liquid, or solid, ammonium carbamate or carbonates. In order to replace the starting material withdrawn by the formation of urea, either fresh carbonic acid and ammonia may be forced into the autoclave separately, or together, or, more simply, an aqueous solution of ammonium carbamate, or carbonate, may be introduced into the top part of the column, which solution can be prepared in a separate vessel from carbon dioxid and ammonia and an impure carbon dioxid may be employed therefor. The proportion of moisture contained in the mixture of ammonia and carbon dioxid to be carried back through the compressor may be controlled by maintaining a suitable temperature at the outlet of the dephlegmator, e. g. that of 60 degrees centigr. is chosen. As a large quantity of water is detrimental to the formation of urea the amount of moisture should be kept small and at any rate below that required for the formation of ammonium carbonate, according to the equation $$2NH_3 + CO_2 + H_2O = (NH_4)_2CO_3.$$

The expansion of the melt may also take place, in order to save compression energy, first down to an intermediate pressure, say 10 atmospheres, at which a part of the carbon dioxid-ammonia mixture distils off and is directly led, for instance, to the second stage of the compressor, whilst the rest will vaporize after the complete expansion in the column and is carried to the first stage of the compressor.

We claim:—

1. The process of manufacturing urea which consists in compressing a mixture of ammonia and carbon dioxid in about the proportions required for the formation of urea while said mixture is kept during compression at an elevated temperature to avoid the separation of ammonium salts, conveying the compressed gaseous mixture while maintaining said temperature, then reducing it to a melt by lowering the temperature and maintaining the melt at a temperature suitable for effecting the formation of urea.

2. The process of manufacturing urea which consists in maintaining a melt of ammonium salts, formed from a mixture of ammonia and carbon dioxid in about the proportions required for the formation of urea, under pressure at the temperature suitable for effecting the formation of urea, withdrawing the reaction mass after urea has been formed, lowering the pressure of the mass withdrawn, separating it into urea solution and a gaseous mixture of ammonia and carbon dioxid, which mixture is again compressed to form a melt while maintaining it during compression and conveyance at an elevated temperature to avoid the separation of liquid or solid ammonium salts.

3. The process of manufacturing urea which consists in maintaining a melt of ammonium salts, formed from a mixture of ammonia and carbon dioxid in about the proportions required for the formation of urea, under pressure at the temperature suitable for effecting the formation of urea, continuously withdrawing part of the reaction mass after urea has been formed, lowering the pressure of the mass withdrawn, separating it into urea solution and a gaseous mixture of ammonia and carbon dioxid, which mixture is again compressed and carried back to the first-named melt, while maintaining the gaseous mixture during compression and conveyance at an elevated temperature to avoid the separation of liquid or solid ammonium salts.

4. The process of manufacturing urea which consists in maintaining a melt of ammonium salts, which is formed from a mixture of ammonia and carbon dioxid in about the proportions required for the formation of urea and in the presence of a small amount of water below that contained in ammonium carbonate, under pressure at the temperature suitable for effecting the formation of urea, continuously withdrawing part of the reaction mass after urea has been formed, lowering the pressure of the mass withdrawn, separating it into urea solution and a gaseous mixture of ammonia and carbon dioxid by heating, which mixture is then again compressed and carried back to the first-named melt which is continuously kept under pressure, while removing from the gaseous mixture part of the moisture and maintaining it during compression and conveyance at an elevated temperature to avoid the separation of ammonium salts.

In testimony whereof we have hereunto set our hands.

CARL BOSCH.
WILHELM MEISER.